Feb. 11, 1947.    M. HABUDA    2,415,741
DIMENSION INDICATING GAUGE
Filed Sept. 10, 1943    2 Sheets-Sheet 1
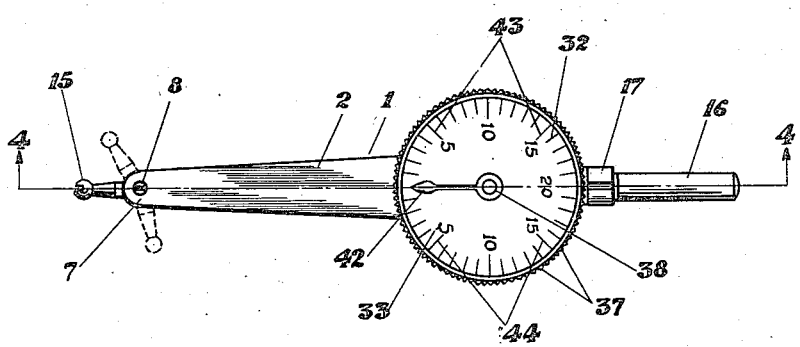
Fig. 1
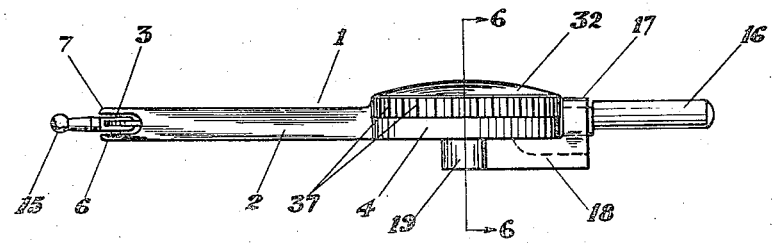
Fig. 2
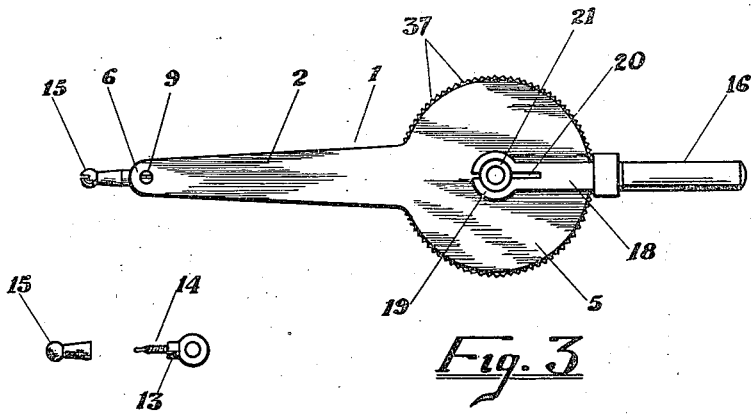
Fig. 3
Fig. 3a
MARTIN HABUDA
INVENTOR
BY
ATTORNEY Feb. 11, 1947. M. HABUDA 2,415,741
DIMENSION INDICATING GAUGE
Filed Sept. 10, 1943 2 Sheets-Sheet 2

MARTIN HABUDA
INVENTOR
BY
ATTORNEY

Patented Feb. 11, 1947

2,415,741

UNITED STATES PATENT OFFICE 2,415,741

DIMENSION INDICATING GAUGE

Martin Habuda, St. Catharines, Ontario, Canada

Application September 10, 1943, Serial No. 501,797
In Canada September 12, 1942

1 Claim. (Cl. 33—172)

This invention relates to improvements in indicators adapted to the purpose of gauging and testing the accuracy of surfaces and of machine work generally, and is particularly adapted for the purpose of gauging and indicating the accuracy of internal surfaces such, for instance, as are produced by jig boring machines and jig grinders.

The primary object of the invention is to provide a gauge indicator of accurate quality adapted to indicate the presence of inaccuracies or error in machine work and capable of being adjusted without the use of further or additional adapters to cover a wide range of accurate measurement in the type of machine work above mentioned.

A further object of the invention is to provide an accurate gauge for locating the spacings and points of measurement for work to be performed by machines such as jig boring machines and jig grinders.

A further object of the invention is to permit of the accurate gauging of small or large apertures without assistance from any other gauging device or adapter.

Other objects of my invention will become evident from the following detailed description taken in conjunction with the accompanying drawings in which Fig. 1 is a top plan view of the indicator embodying the invention.

Fig. 2 is a side elevation thereof.

Fig. 3 is a bottom plan view showing the adjustable holding member.

Fig. 3a is a plan view of the contact point.

Like characters of reference in the drawings indicate like parts.

Figure 4:
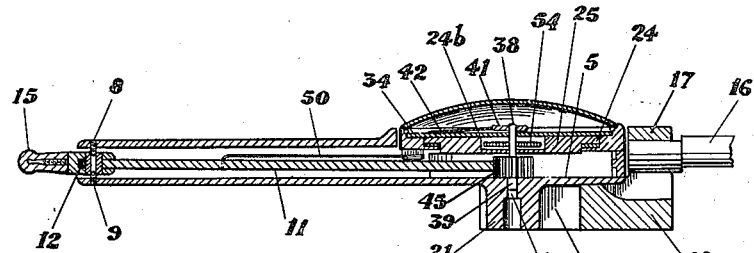
Fig. 4 is a longitudinal cross section view taken on the line 4—4 of Fig. 1, looking in the direction of the arrows illustrating in detail the construction of the indicator.
Figure 5:
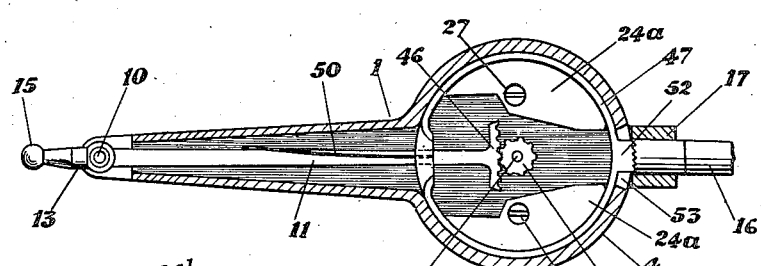
Fig. 5 is a longitudinal cross section view taken at right angles to Fig. 4.
Figure 6:
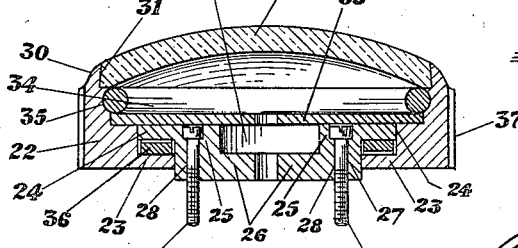
Fig. 6 is a transverse cross sectional view taken on the line 6—6 of Fig. 2, looking in the direction of the arrows.
Figure 7:
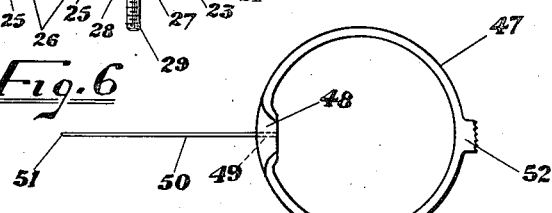
Fig. 7 is a top plan view of the reversing spring and the ring holder therefor.
Figure 8:
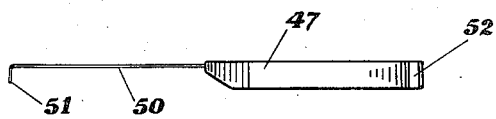
Fig. 8 is a side elevation view of the spring and ring holder.

1 indicates an indicator having an elongated casing portion 2, tapering to an open end 3, provided on the opposite end with a circular casing housing 4, provided with a bottom wall 5 as shown in Fig. 3.

The open end of the elongated housing 2 is provided with ears 6 and 7, having apertures for receiving adjustable centre screws 8 and 9 respectively, the inner ends of which are pointed to form pivot bearings entering a bushing 10, having opposite ends countersunk to conform to the pointed portion of the centre screws 8 and 9. Frictionally mounted on the bushing 10 is one end 12 of a sector arm 11.

Frictionally fitted on the bushing 10 is a movable and adjustable contact arm 13 having a bifurcated portion adapted to straddle the end 12 of the sector arm 11. The free end of the contact arm 13 terminates in a point and may be threaded as shown at 14 to receive a spherical contact member 15 which may be varied as to size and shape. It is obvious that the threading 14 may be omitted and that the member 15 may be of a suitable shape to enable it to be slipped over the free end of the contact arm 13 and be held there by friction.

An opposed adjustable holder member 16 is mounted on the opposite end of the indicator 1 and is rotatably carried by a boss 17 formed on the free end of an extension arm 18. The rotatably adjustable holder 16 has an eccentric end portion set in the boss 17 at a slight eccentricity to an extent which may be desired, but which in practice I have found to be suitable if set at .005″. The purpose of this eccentric setting will be more particularly explained hereafter.

The inner end of the extension arm 18 is provided with a bearing portion 19 split as at 20 so that the bearing portion will frictionally engage a rounded boss 21 centrally located with respect to the bottom wall 5 of the casing 4. The adjustable holder member 16 may be swung to the right or left of the pivot 21 about the circular casing 4 to adjust the contact for various uses.

A circular indicator casing 22 is rotatably mounted with respect to the circular housing 4 and is provided with an annular flange 23 upon which is adapted to rest the annular plate 24 having offset portions 25 terminating in foot portions 26 adapted to be secured to the bosses 24a by machine screws 27, extending through openings 28, formed in the offset portions 25, so that the screw threaded ends 29 may be received in correspondingly threaded openings formed in the bosses 24a.

The circular indicator casing 22 is provided with a bevel flange 30 for receiving the bevelled edge 31 of an unbreakable crystal 32. A graduated dial 33 is supported in the annular casing 22 and is held in place by means of a split ring 34 snapped into engagement in an annular recess 35 formed internally in the circular indicator casing 22. Interposed between the flanges 24 and the flanges 23 of the casing is a flat circular spring 36 which causes the circular indicator casing to be drawn downward upon the circular casing 4 in a frictional manner. The circular indicator casing 22 may be rotated by engaging the knurled portion 37 thereof and turning the indicator casing on the flanges 24.

The central portion of the annular plate 24 is countersunk as shown at 24b and within the aperture thus formed and surrounding the pinion shaft 38 is placed a hair spring 54 which operates the return of the pinion shaft 38 to its central position when the contact arm 13 is moved in one direction and at the same time tends to eliminate any back lash between the meshes of the gears formed by pinion 45 and gears 46 of sector arm 11 when operated in the opposite direction.

The vertical pinion shaft 38 has its lower end 39 received in an opening 40 located centrally with respect to the rounded boss or pivot 21 in the floor 5 of the casing 4 and the upper end of the pinion shaft 38 is provided with a collar 41 to which is attached a pointer 42 capable of registering with the graduations on the dial 33 as shown in Fig. 1. The graduations 43 may be adapted to range from any given set of numbers from zero upward on either side of the dial as may be desired. In the illustration shown in Fig. 1 the graduations 43 range from 0 to 20 on each side of the dial. The pointer 42 is capable of moving to the right or left to register with either set of graduations 43 and 44.

Also secured to the pinion shaft 38 is a pinion 45 adapted to mesh with a segment gear 46 formed on the inner end of the sector arm 11 associated with the movable contact arm 13. Oscillation of the arm 11 about its pivot bushing 10 will cause the rotation of the pinion 45 in both directions so that the pointer 42 may move to the right or left over the graduations 43 and 44 in the same plane of movement as the arm 11.

Rotatably mounted within the said walls of the circular casing 4, is a flat ring 47 having frictional contact engagement therewith and having one end bent inwardly as at 48 for being transversely bored as at 49 to receive the inner end of a reverse spring 50. The free end of the reverse spring 50 is bent as at 51 and is adapted to rest against the sector arm 11 for the purpose of reversing the indicator mechanism. A thumb piece 52 is provided at the diametrically opposite point of the ring 47, and said thumb piece operates in an opening 53 formed in the vertical wall of the circular casing 4.

The movable contact member 13 may be adjusted about the bushing 10, to the right or left of the casing extension 2 as shown by the examples of the dotted positions in Fig. 1, and the adjustable holder 16 may be swung to a corresponding position about the pivot boss 21. The reverse spring 50 and the hair spring 54 will in all cases cause the indicator pointer to work from either direction desired and constitute the necessary resistance to the movement of the sector arm 11 in order to ensure accurate gauging of the surfaces to be examined. The circular ring 47 may be moved to throw the spring 50 off dead centre to the right or left and the indicator casing may be rotated to cause the dial and the graduations thereon to be clearly visible from the position occupied by the operator.

In operation the adjustable holder is rigidly secured in the collet or chuck of the machine spindle and the work to be gauged is moved and placed in position under the contact point 13. Upon placing the free end 15 of the contact point 13 in contact with the work to be gauged any errors or inaccuracies are communicated by the sector arm 11 through the mechanism explained, to the pointer 42.

If the collet or chuck is out of correct alignment, the eccentric holder 16 may be used to bring the contact point 15 in central alignment with the axle of the spindle, thus enabling the contact point to be used in gauging very small apertures.

What I claim as my invention is:

In an indicator for measuring surfaces, a unitary casing comprising a dial housing, an extension therefrom having a forked extremity for pivotally mounting a contact member, a cylindrical boss on the dial housing, an arm in which said boss is frictionally secured, an extension on said arm extending substantially at right angles to said arm and adjacent to said casing, and a holder member rotatably and eccentrically secured in said extension and disposed at substantially right angles thereto, for adjustably displacing said forked extremity with respect to the axis of said holder member on rotation of said holder member.

MARTIN HABUDA.

REFERENCES CITED

The following references are of record in the file of this patent:

UNITED STATES PATENTS

| Number | Name | Date |
|---|---|---|
| 1,377,006 | Deming | May 3, 1921 |
| 1,446,437 | Barili | Feb. 20, 1923 |
| 1,466,664 | Lowe | Sept. 4, 1923 |
| 2,121,848 | Winters | June 28, 1938 |
| 2,308,207 | Reinhard | Jan. 12, 1943 |